United States Patent [19]

Furutsu et al.

[11] Patent Number: 4,926,084
[45] Date of Patent: May 15, 1990

[54] DRIVING APPARATUS FOR A VIBRATION WAVE MOTOR

[75] Inventors: Etsuro Furutsu, Kawasaki; Kazuhiro Izukawa, Yokohama, both of Japan

[73] Assignee: Canon Kabushiki Kaisha, Tokyo, Japan

[21] Appl. No.: 346,917

[22] Filed: May 3, 1989

[30] Foreign Application Priority Data

May 6, 1988 [JP] Japan ................... 63-111339

[51] Int. Cl.⁵ ............................................. H01L 41/08
[52] U.S. Cl. ..................................... 310/316; 310/323
[58] Field of Search ...................... 310/316, 317, 323; 318/116, 118

[56] References Cited

U.S. PATENT DOCUMENTS

| 4,510,411 | 4/1985 | Hakamata et al. | 310/316 |
| 4,713,571 | 12/1987 | Suzuki et al. | 310/316 |
| 4,727,276 | 2/1988 | Izukawa et al. | 310/316 |
| 4,743,788 | 5/1988 | Takagi et al. | 310/316 |
| 4,748,365 | 5/1988 | Poupaert et al. | 310/316 |
| 4,812,699 | 3/1989 | Ogawa et al. | 310/316 |
| 4,833,358 | 5/1989 | Suzuki et al. | 310/316 |
| 4,853,579 | 8/1989 | Kawasaki et al. | 310/316 |

FOREIGN PATENT DOCUMENTS 0002869  1/1987  Japan ..................................... 310/323

Primary Examiner—Mark O. Budd
Attorney, Agent, or Firm—Fitzpatrick, Cella, Harper & Scinto

[57] ABSTRACT

Disclosed is a driving apparatus for a vibration wave motor in which monitor means is provided for detecting the vibrating state of the vibration wave motor and the difference between the resonance frequency and the frequency of a driving AC signal is detected on the basis of the phase difference between the output signal from the monitor means and the driving AC signal and when the frequency difference is great during the change of the number of revolutions of the motor, the vibration rate of the frequency of the driving AC signal is made greater to improve the responsiveness while, on the other hand, when the frequency difference is small, the variation rate of the frequency of the driving AC signal is made smaller to thereby prevent the occurrence of an unstable operation in which the frequency of the driving AC signal exceeds the resonance frequency to cause sudden stoppage of the motor.

8 Claims, 4 Drawing Sheets

DRIVING APPARATUS FOR A VIBRATION WAVE MOTOR

BACKGROUND OF THE INVENTION

1. Field of the Invention

This invention relates to a driving device for a vibration wave motor, and in particular to a circuit for detecting the amount of deviation between the resonance frequency and the driving frequency of a motor by the use of a phase difference detecting device and stably driving a vibration wave motor.

2. Related Background Art

To drive a vibration wave motor efficiently, it is desired to drive the motor at a mechanical resonance frequency, and a method of providing a monitor electrode for detecting the vibrating state of a motor, and controlling the frequency so that the phase difference between a signal from the electrode and a driving signal becomes constant is proposed in U.S. application Ser. No. 915,429 (filed on Oct. 6, 1986).

Also, to obtain various numbers of revolutions from a motor, it is necessary to drive the motor at other frequencies than the resonance frequency, and it is usual that the motor is driven at frequencies higher than the resonance frequency.

That is, when varying the number of revolutions of the motor, there is adopted a method of arbitrarily setting a frequency higher than the resonance frequency and controlling the number of revolutions of the motor.

When varying the driving frequency in controlling the number of revolutions of the motor by the above-described method, if the variation rate of that frequency is made greater, the number of revolutions can be varied with good responsiveness, while in a state in which that frequency is approximate to said resonance frequency, if the frequency is changed at a great variation rate, there is the fear that the frequency after changed exceeds said resonance frequency and the motor stops and thus stable revolution of the motor becomes impossible.

SUMMARY OF THE INVENTION

It is an object of the present invention to provide a driving apparatus for a vibration wave motor which solves the above-noted problem.

The present invention intends to provide a driving apparatus for a vibration wave motor in which monitor means is provided for detecting the vibrating state of the vibration wave motor and the difference between the resonance frequency and the frequency of a driving AC signal is detected on the basis of the phase difference between the output signal from the monitor means and the driving AC signal and when the frequency difference is great during the change of the number of revolutions of the motor, the variation rate of the frequency of the driving AC signal is made greater to improve the responsiveness while, on the other hand, when said frequency difference is small, the variation rate of the frequency of the driving AC signal is made smaller to thereby prevent the occurrence of an unstable operation in which the frequency of the driving AC signal exceeds the resonance frequency to cause sudden stoppage of the motor.

Other objects of the present invention will become apparent from the following detailed description of the invention taken in conjunction with the accompanying drawings.

DESCRIPTION OF THE PREFERRED EMBODIMENTS

Figure 1:
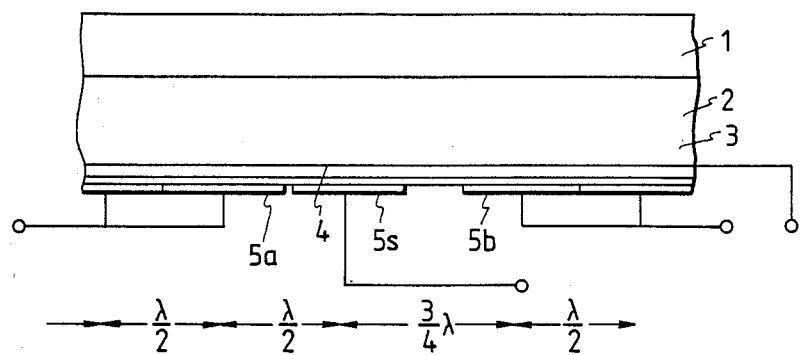
FIG. 1 is a cross-sectional view of a ring-shaped vibration wave motor to which the present invention is applied.

Referring to FIG. 1 which is a cross-sectional view of a vibration wave motor according to the present invention as seen from the circumferential direction thereof, the reference numeral 1 designates a rotor, the reference numeral 3 denotes a vibration member, the reference numeral 4 designates a piezo-electric member as an electro-mechanical energy converting element attached onto the vibration member and subjected to the polarization processing, and the reference numeral 5 denotes electrodes. A stator 2 is constituted by the vibration member 3 and the piezo-electric member 4, and the rotor 1 is in frictional contact with the vibration member 3.

When the wavelength of the flexural travelling wave in said electrodes 5 and said vibration member 3 is $\lambda$, the driving electrodes 5a are disposed at an interval of $\lambda/2$ on the pizeo-electric member 4 and the driving electrodes 5b are also disposed at interval of $\lambda/2$. The reference character 5S designates vibration detecting electrodes, and the driving electrodes 5a and the vibration detecting electrodes 5S are out of positional phase by $\lambda/2$ (that is, are in the same phase). Also, the electrodes 5b and 5a are out of positional phase by $3\lambda/4$, and a piezo-electric member of A phase is constituted by the piezo-electric member to which a driving voltage is applied through the electrodes 5a, and a piezo-electric member of B phase is constituted by the piezo-electric member to which a driving voltage is applied through the electrodes 5b. The polarization processing of these piezo-electric members and the arrangement and construction of the electrodes are well known and therefore need not be described in detail.

In the above-described construction, frequency voltages differing in time phase by 90° are applied to the electrodes 5a and the electrodes 5b, whereby a travelling vibration wave is generated on the vibration member 3, and the rotor 1 is driven by said vibration wave. When the driving signal to the electrodes 5a is of a resonance frequency fr, the signal wave form from the electrodes 5S becomes −90° out of phase relative to the driving signal to the electrodes 5a, and when the driving signal deviates from the resonance frequency, the phase difference between the electrodes 5a and 5S deviates from 90°. Consequently, if this phase difference is detected, the deviation of the driving frequency from the resonance frequency fr can be detected.

The phase difference between the resonance frequency and the signals of the electrodes 5a and 5S assumes a value differing from said −90° in conformity with the positions of the electrodes 5S and 5a, but even in that case, if the motor is in the resonance-driven state, the phase difference between the signals of the electrodes 5a and 5S assumes a particular relation and therefore, again in this case, if the deviation of the phase difference between the signals of the electrodes 5a and 5S from said particular phase difference is detected, the deviation of the driving frequency from the resonance frequency fr can be detected.

Figure 2:
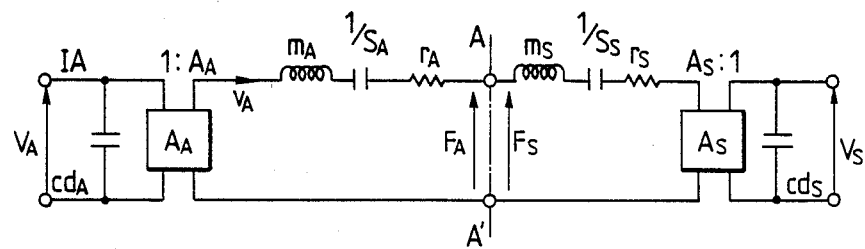
FIG. 2 is an equivalent circuit diagram of the motor shown in FIG. 1.
Figure 3:
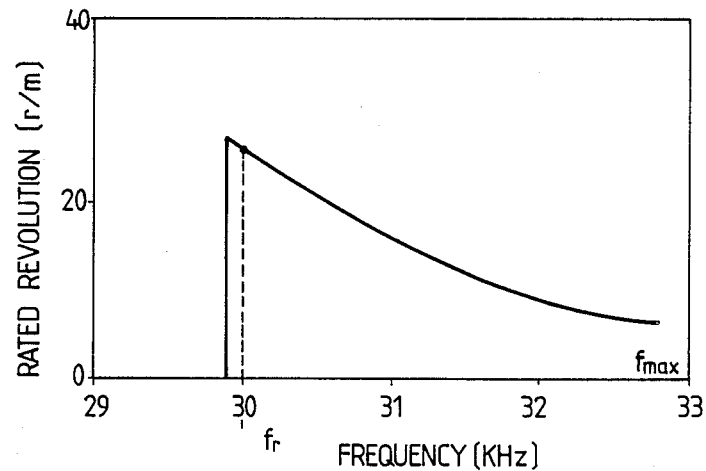
FIG. 3 is a graph illustrating the speed control characteristic by the driving apparatus for the vibration wave motor according to the present invention.

FIG. 2 shows an electrical equivalent circuit diagram of the vibration wave motor of the FIG. 1 construction, and FIG. 3 is a wave form graph showing the characteristic of the rated number of revolutions to the driving AC signal of the vibration wave motor.

Figure 4:
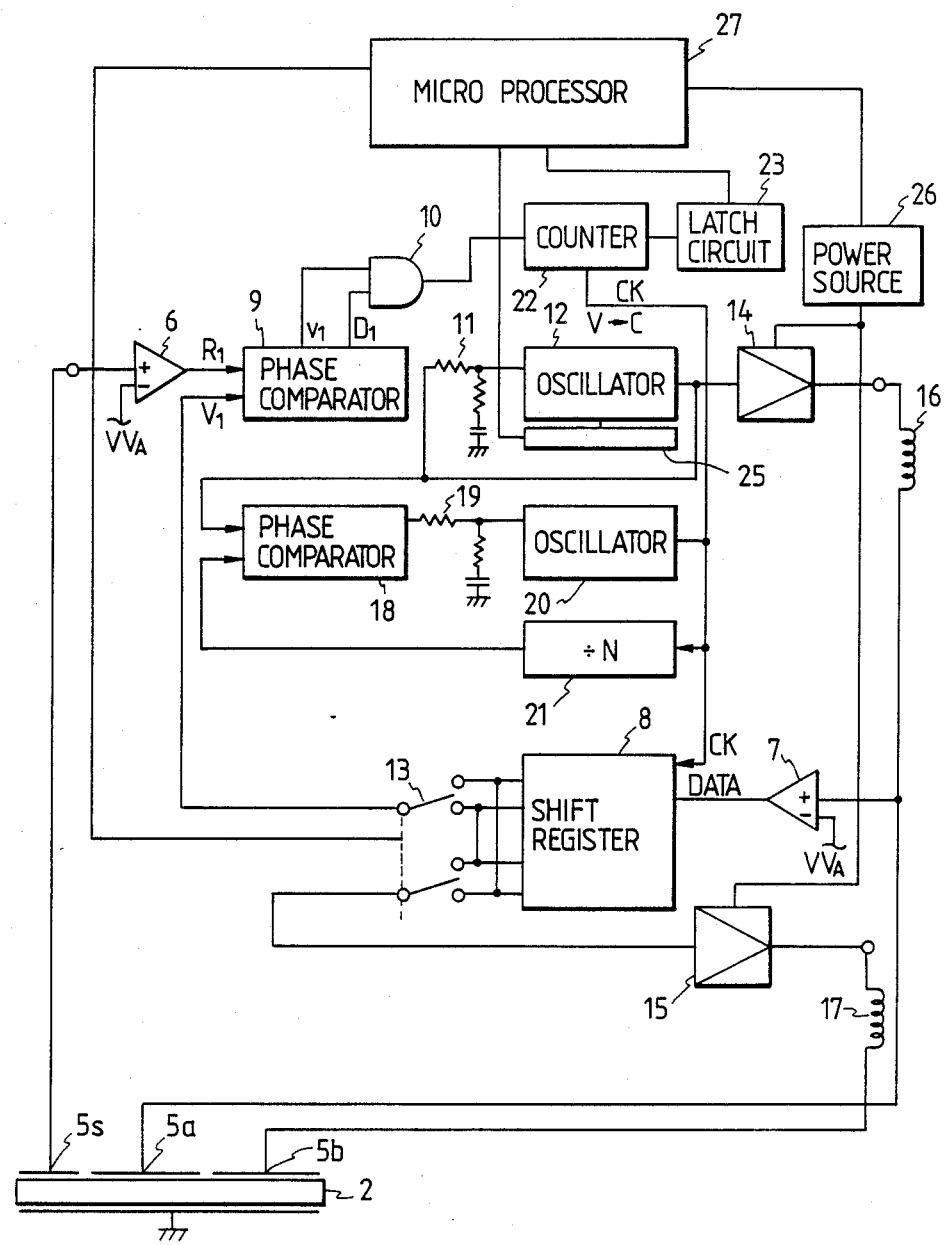
FIG. 4 is a circuit diagram showing an embodiment of the driving apparatus for the vibration wave motor according to the present invention.

FIG. 4 is a circuit diagram showing an embodiment of the driving circuit for the vibration wave motor according to the present invention.

In FIG. 4, the reference numeral 2 designates the stator of the vibration wave motor shown in FIG. 1. The reference numeral 12 denotes a voltage control oscillator adapted to oscillate at a frequency conforming to the input voltage, the reference numeral 14 designates an amplifier, and the reference numeral 16 denotes a matching coil. The frequency signal from the oscillator 12 is applied to the electrodes 5a through the amplifier 14 and the coil 16. The reference numeral 7 designates a comparator for shaping the wave form of the output of the amplifier passed through the coil 16 (i.e., the wave form of the voltage applied to the stator of the vibration wave motor) into a pulse signal, and the reference numeral 8 denotes a shift register for shifting the pulse from the comparator 7 by 90°. The pulse from the register 8 is applied to the electrodes 5b through a rotational direction change-over switch 13 and through an amplifier 15 and a coil 17. By the above-described construction, frequency voltages differing in phase by 90° are applied between the electrodes 5a and 5b. The reference numeral 18 designates an edge trigger type phase comparator. The output of the oscillator 12 is input as one input of the comparator 18, and the output of an N-frequency dividing circuit (a 32-frequency dividing circuit) 21 is input as the other input of the comparator 18. The reference numeral 20 denotes a voltage control oscillator which generates a frequency conforming to the output of the comparator 18 through a lag lead filter 19. The comparator 18 becomes open when the phase difference between the input signals is zero, and maintains the output of the oscillator 20 in that state, and when a phase difference occurs between said input signals, the comparator 18 outputs a signal of different duty in conformity with the direction and amount of the deviation of that phase difference, and increases or decreases the output frequency of the voltage control oscillator 20. With such a construction, the two inputs of the comparator 18 are controlled so as to assume the same phase, and in that state, the output of the frequency dividing circuit 21 is of the same phase and of the same frequency as the output of the oscillator 12. Accordingly, the output of the oscillator 20 becomes a signal of a frequency N times (32 times) as high as the output frequency of the oscillator 12, and this signal is used as the clock signal of the shift register 8 and therefore, the {N(32)/4}th step output of this register 8 becomes a signal differing in phase by 90° from the output of the comparator 7, i.e., the output of the oscillator 12, and frequency signals of 90° phase difference are supplied between the electrodes 5b and 5a in the manner described above.

Figure 5A:
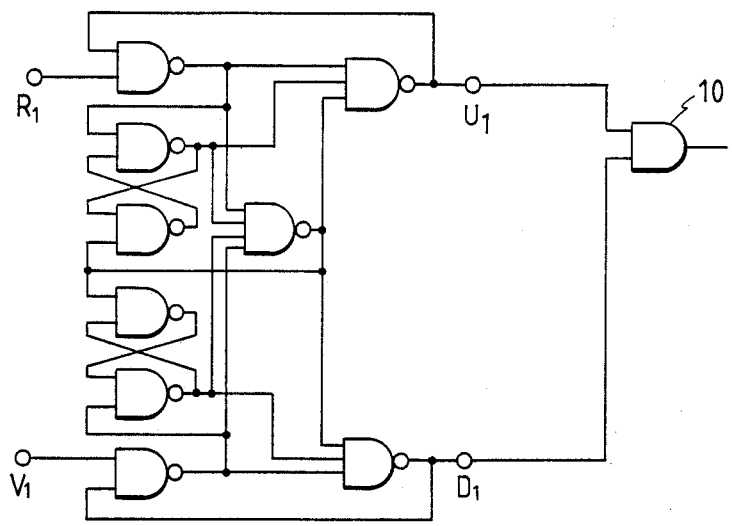
FIG. 5(a) is a circuit diagram showing the construction of a comparison circuit shown in FIG. 4.
Figure 5B:
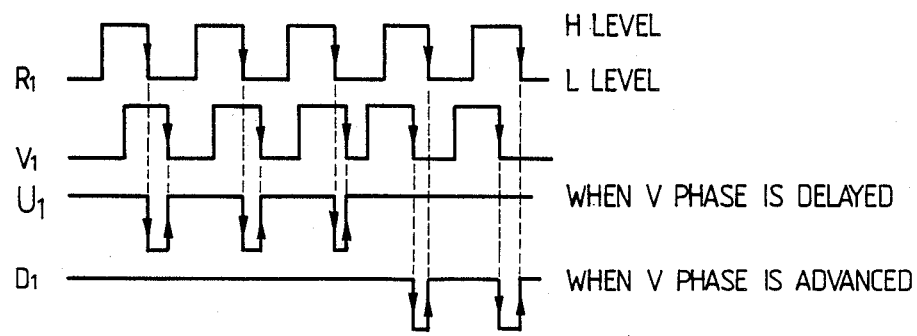
FIG. 5(b) is a wave form diagram showing the output wave forms of the circuit shown in FIG. 5(a).

The reference numeral 6 designates a comparator for shaping the signal from the electrodes 5S into a pulse, and the reference numeral 9 denotes an edge trigger type phase comparator. This comparator 9 is constructed as shown in FIG. 5(a). This comparator 9 detects the phases of the pulses of inputs $R_1$ and $V_1$, and when as shown in FIG. 5(b), the phase of the input $R_1$ is more advanced than the phase of the input $V_1$, the comparator 9 renders an output $U_1$ (see FIG. 5(a)) into a low level for a time corresponding to that phase difference, and when the phase of the input $R_1$ is more delayed than the phase of the input $V_1$, the comparator 9 renders an output $D_1$ (see FIG. 5(a)) into a low level for a time corresponding to that phase difference, and when the phases of the inputs $R_1$ and $V_1$ are coincident with each other, the comparator 9 renders both of the outputs $V_1$ and $D_1$ into a high level.

The reference numeral 10 designates an AND gate connected to the outputs $U_1$ and $D_1$ of the comparator 9, the reference numeral 22 denotes a counter having its reset terminal connected to the AND gate 10 and adapted to be released from its reset state and count the clock pulse of the oscillator 20 when the output of the AND gate 10 is at a high level, and the reference numeral 23 designates a latch circuit as a temporary memory device for latching the count value of the counter 22.

The reference numeral 25 denotes the self-running frequency setter of the voltage control oscillator 12, the reference numeral 26 designates a constant voltage source, and the reference numeral 27 denotes a microcomputer.

Figure 6:
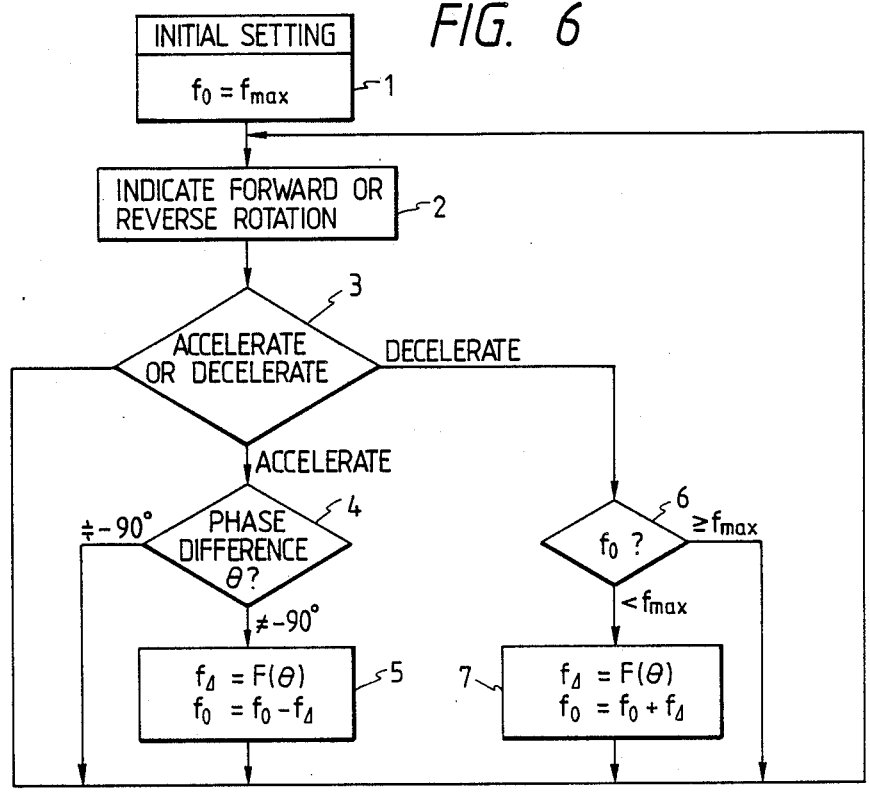
FIG. 6 illustrates a program contained in a computer shown in FIG. 4.

The operation of the FIG. 4 embodiment will now be described in accordance with the program of FIG. 6. It is to be understood that this program is contained in the computer 27.

By closing a power source switch, not shown, the program assumes step 1, where utilization is effected and fo as the self-running frequency is set in the self-running frequency setter 25. This self-running frequency fo is set to a value sufficiently higher than the mechanical resonance frequency fr of the vibration wave motor and lower than $frx(n+1)^2/n^2$ (n being the number of waves created on the stator of the motor). The voltage control oscillator 12 oscillates at the set frequency fo. Also, the computer 27 sets $V_{ON}$ as a driving voltage, and the constant voltage source 26 outputs said $V_{ON}$ as the driving voltage.

In this state, a clock signal of a frequency N times as high as the output frequency fo of the oscillator 12 is supplied as a shift pulse to the shift register 8 and therefore, a signal deviated by ±90° (±N/4 steps) relative to the output of the voltage control oscillator 12 is transmitted to the electrodes 5b through the amplifier 15 and the coil 17 and thus, frequency signals of 90° phase difference are applied between the electrodes 5a and 5b as described above. At step 2, a selection switch 13 is changed over in conformity with forward or reverse rotation information set by a member, not shown, and the selection and change-over of said ±90° is effected.

In this state, the motor effects forward or reverse rotation because a frequency signal deviated by +90° or −90° in conformity with the direction of rotation determined by the switch 13 is applied between the electrodes 5a and 5b. A signal conforming to this rotation of the motor is output from the electrodes 5S, is shaped into a pulse by the comparator 6 and is transmitted to the input end $R_1$ of the comparator 9.

As described above, at the initial stage of the driving of the motor, the frequency of the oscillator 12 is fo which is higher than the resonance frequency and the motor is rotating at the minimum number of revolutions. The phase of the signal from the electrodes 5S conforming to the rotational state of the motor and the phase of the driving signal of the electrodes 5a deviate by 90° from each other, and deviate more from the phase difference of 90° as they deviate more from the resonance frequency. Consequently, the signal $V_1$ resulting from the frequency signal of the electrodes 5a being shifted by 90° by the shift register 8 and the signal $R_1$ from the electrodes 5S have their phases coincident with each other in the resonant state, and the phase difference therebetween becomes greater as the deviation from the resonant state becomes greater. Consequently, the output $V_1$ or $D_1$ of the comparator 9 exhibits a low level corresponding to said phase difference, and the AND gate 10 also outputs a low level corresponding to said phase difference. Accordingly, in the initial state, the frequency fo of the driving signal deviates considerably from the resonance frequency and therefore, the period of time during which the AND gate outputs a low level is long, and the count value of the counter 22 is a small value.

Also, the latch circuit 23 latches the count value immediately before the counter 22 is reset each time the counter 22 counts, and at step 4, the computer 27 detects the output of the counter 22 latched by the latch circuit 23, and if the output value of the counter 22 is smaller than a predetermined value N=32 (−90°), shift is made to step 5, where the set frequency fo in the self-running frequency setter 25 is gradually reduced. That is, in conformity with the output of the counter 22, a new frequency fo is set as fo=fo−fΔ by a function fΔ=F(θ) shown in FIG. 7. The steps 4 and 5 are repetitively executed and the frequency of the driving signal to the electrodes 5a gradually becomes approximate to the resonance frequency fr. On the other hand, as regards the output of the AND gate 10, the time during which the AND gate 10 outputs a low level gradually becomes shorter as the output of this AND gate becomes approximate to the resonance frequency fr, and the count value of the counter 22 gradually becomes higher.

In the manner described above, the driving frequency to the electrodes 5a is gradually reduced in the process in which the steps 4 and 5 are repeated, and when it reaches the resonance frequency fr, the count value of the counter 22 becomes greater than said predetermined value and therefore, the computer 27 judges that the driving frequency has reached the resonance frequency, and does not change the frequency.

The above-described operation is that when the acceleration command for the motor has been detected at step 3, and description will now be made of a case where the deceleration command has been detected at the step 3.

Figure 7:
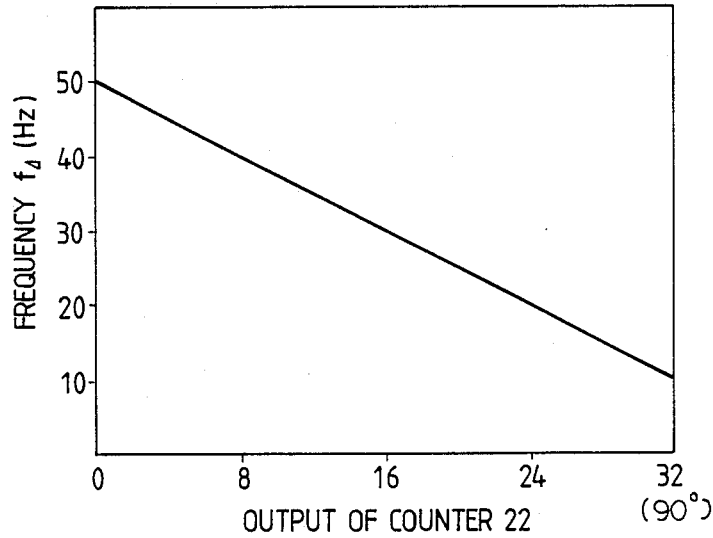
FIG. 7 shows a function of $f\Delta$ in FIG. 6.

In this case, step 6 is executed subsequently to the step 3, and whether the driving frequency fo is smaller than fmax is detected. When the deceleration command is put out in a state in which the motor is driven at the driving frequency fo smaller than fmax, shift is made to step 7, where fΔ is calculated in conformity with the output of the counter 22 and a new frequency fo is set as fo=fo+fΔ. Thereafter, the steps 6 and 7 are repetitively executed and the frequency of the driving signal to the electrodes 5a gradually becomes higher and becomes approximate to the maximum speed driving frequency fmax. On the other hand, the output of the AND gate 10 deviates from the resonance frequency fr, whereby the time during which a low level is output gradually becomes longer, and the count value of the counter 22 gradually becomes lower.

fΔ is set as the function shown in FIG. 7 in the computer 27 when fΔ is calculated at the steps 5 and 7 described above and therefore, when the value of the counter 22 is great, the value of fΔ becomes smaller and the variation rate of the self-running frequency fo becomes smaller, and the motor can be stably driven in the vicinity of the resonance frequency. Also, when the value of the counter 22 is small, the value of fΔ becomes greater and the variation rate of the self-running frequency fo becomes greater, and any sudden change in the number of revolutions of the motor can be coped with.

The piezo-electric member is used in the above-described embodiment, but alternatively, an electrostrictive element may be used.

As described above, in the present invention, the difference between the frequency of the driving AC signal and the mechanical resonance frequency of the motor is detected, and when the frequency difference is great, the variation rate of the frequency is made greater, and when the frequency difference is small, the variation rate of the frequency is made smaller and therefore, in the vicinity of the resonance frequency, the variation in the frequency becomes smaller and stable motor driving can be accomplished, and on the other hand, for a frequency higher than the resonance frequency, the variation in the frequency is made greater, whereby any sudden change in the number of revolutions can be coped with.

What is claimed is:

1. A vibration wave driven motor comprising:
   (a) a first member having a friction surface;
   (b) a vibration member arranged in contact with the friction surface of said first member;
   (c) an electro-mechanical transducer arranged in contact with said vibration member to generate the travelling vibration wave to said vibration member in response to an applied driving signal with a predetermined frequency;
   (d) monitoring means for monitoring the vibrating state of said motor and outputting a signal conforming to the amount of deviation from the resonancevibrating state; and
   (e) frequency changing means responsive to the output signal from said monitoring means to change the frequency of the driving signal greatly when said amount of deviation is greater than a predetermined value, and to change the frequency of the driving signal small when said amount of deviation is smaller than said predetermined value.

2. A motor according to claim 1, wherein said monitoring means includes a vibration detecting sensor arranged in contact with the vibration member.

3. A motor according to claim 2, wherein said monitoring means outputs a signal conforming to the phase difference between the output signal from the sensor and the driving signal.

4. A motor according to claim 2, wherein said monitoring means includes a phase comparator outputting a signal conforming to the phase difference between the output singal from the sensor and the driving signal.

5. A vibration wave driven motor comprising:
   (a) a first member having a friction surface;
   (b) a vibration member arranged in contact with the friction surface of said first member;
   (c) an electro-mechanical transducer arranged in contact with said vibration member to generate the travelling vibration wave to said vibration member in response to an applied driving signal with a predetermined frequency;
   (d) detecting means for detecting the vibrating state of said motor and generating an output signal conforming to the phase difference between the frequency of the driving signal and the resonance frequency of the motor; and
   (e) frequency changing means responsive to the output signal from the detecting means to change the frequency of the driving signal greatly when said phase difference is greater than a predetermined value, and to change the frequency of the driving signal small when said phase difference is smaller than said predetermined value.

6. A motor according to claim 5, wherein said monitoring means includes a vibration detecting sensor arranged in contact with the vibration member.

7. A driving circuit for a vibration wave driven body in which a travelling vibration wave is generated in a vibration member having at least a pair of electro-mechanical energy converting elements arranged or polarized in the fashion of a phase difference by applying a periodic signal to said electro-mechanical energy converting elements and said vibration member and a contact member are moved relative to each other by said travelling vibration wave, said driving circuit comprising:
   (a) monitoring means for monitoring the vibrating state of said driven body and outputting a signal conforming to the amount of deviation from the resonance-vibrating state; and
   (b) frequency changing means responsive to the output signal from said monitoring means to change the frequency of the periodic signal greatly when said amount of deviation is greater than a predetermined value, and to change the frequency of the periodic signal small when said amount of deviation is smaller than said predetermined value.

8. A driving circuit for a vibration wave driven body in which a travelling vibration wave is generated in a vibration member having at least a pair of electro-mechanical energy converting elements arranged or polarized in the fashion of a phase difference by applying a periodic signal to said electro-mechanical energy converting elements and said vibration member and a contact member are moved relative to each other by said travelling vibration wave, said driving circuit comprising:
   (a) detecting means for detecting the vibrating state of said body and generating an output signal conforming to the phase difference between the frequency of the periodic signal and the resonance frequency of the body; and
   (b) freuqency changing means responsive to the output signal from the detecting means to change the frequency of the periodic signal greatly when said phase difference is greater than a predetermined value, and to change the frequency of the periodic signal small when said phase difference is smaller than said predetermined value.

* * * * *

UNITED STATES PATENT AND TRADEMARK OFFICE
CERTIFICATE OF CORRECTION

PATENT NO. : 4,926,084

DATED : May 15, 1990

INVENTOR(S) : ETSURO FURUTSU, ET AL.

It is certified that error appears in the above-identified patent and that said Letters Patent is hereby corrected as shown below:

IN [57] ABSTRACT

Line 9, "vibration" should read --variation--.

COLUMN 6

Line 54, "nancevibrating" should read --nance-vibrating--.

COLUMN 7

Line 4, "output singal" should read --output signal--.

COLUMN 8

Line 29, "freuqency" should read --frequency--.

Signed and Sealed this

Seventeenth Day of December, 1991

Attest:

HARRY F. MANBECK, JR.

*Attesting Officer*  *Commissioner of Patents and Trademarks*